UNITED STATES PATENT OFFICE.

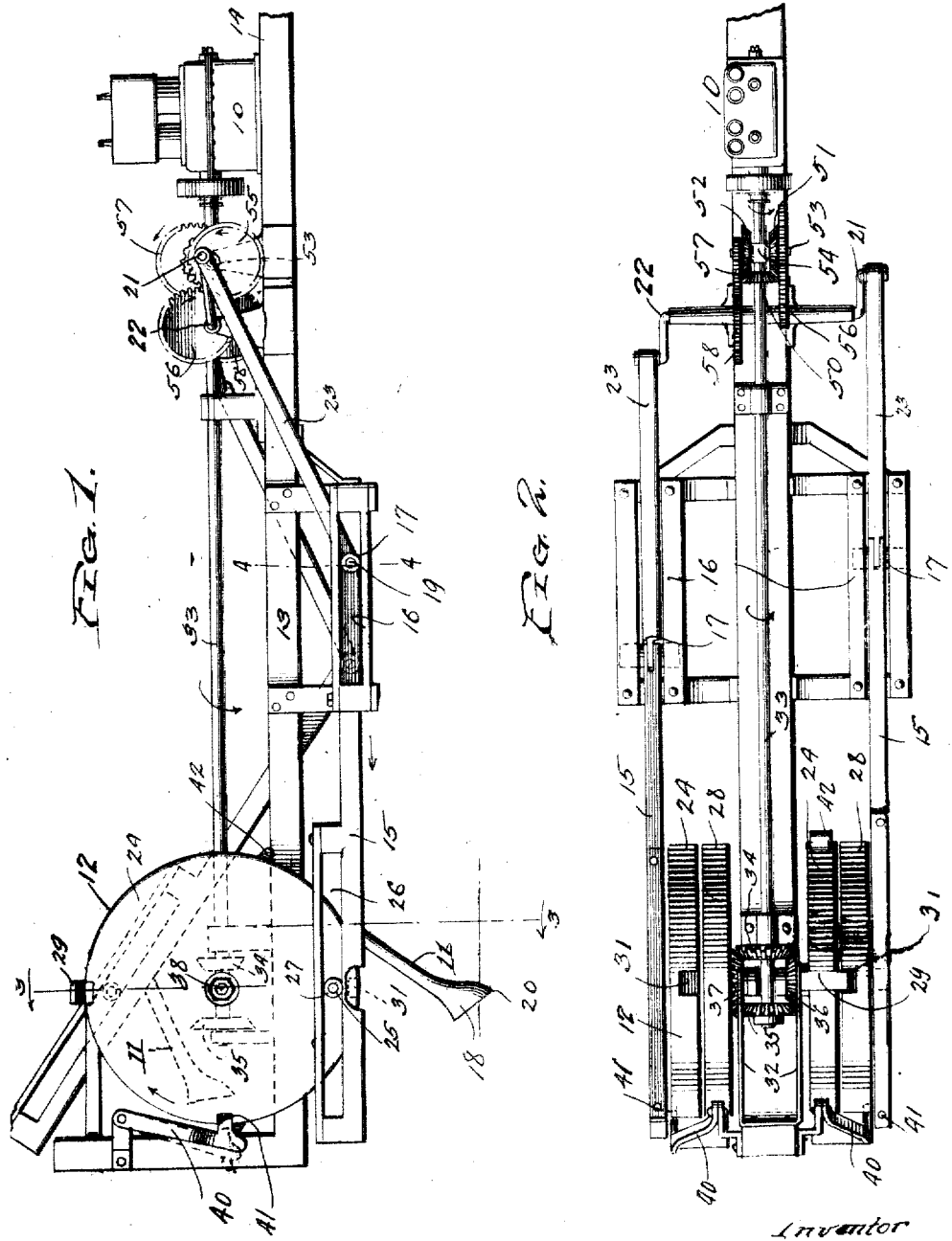

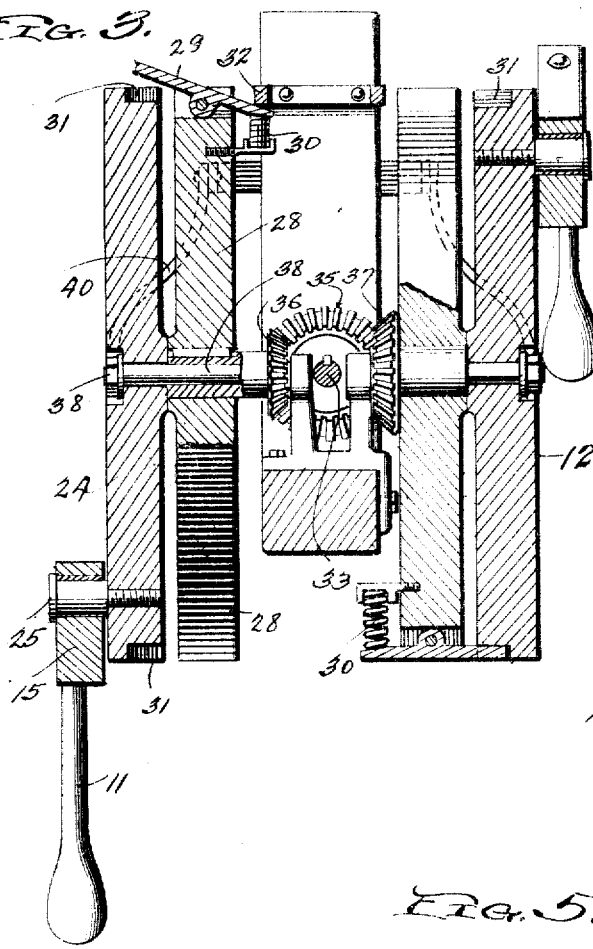
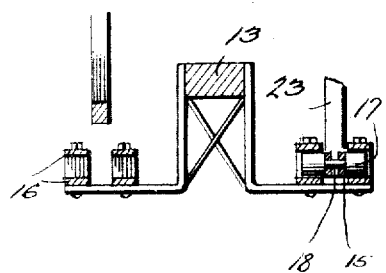
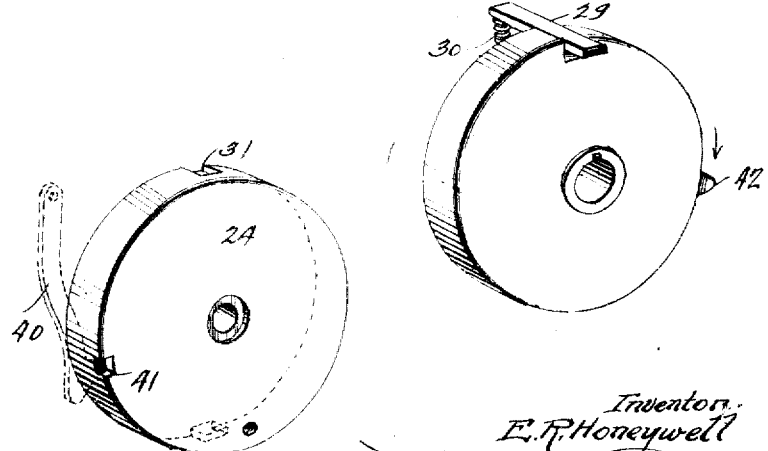

EDWARD R. HONEYWELL, OF GARBER, OKLAHOMA.

WALKING TRACTOR.

1,351,752.   Specification of Letters Patent.   Patented Sept. 7, 1920.

Application filed August 27, 1919. Serial No. 320,282.

*To all whom it may concern:*

Be it known that I, EDWARD R. HONEYWELL, a citizen of Canada, residing at Garber, in the county of Garfield, State of Oklahoma, have invented certain new and useful Improvements in Walking Tractors; and I do hereby declare the following to be a full, clear, and exact description of the invention, such as will enable others skilled in the art to which it appertains to make and use the same.

The object of the invention is to provide a propelling apparatus or tractor adapted for pushing or pulling vehicles, farm machinery and implements and the like over surfaces which are uneven or irregular or loose and soft and therefore afford an unsatisfactory and unreliable purchase for traction wheels. In this connection it is an object to provide ground engaging means which are not open to the objection of packing the soil continuously in the paths of the traction wheels commonly used and necessary for wheeled tractors in order to secure an advance movement.

A further object is to provide a walking tractor or propeller wherein a positive and effective engagement of the pusher feet with the ground or road surface is insured preliminary to the application of the pushing impulse thereto, so that lost motion and waste of energy may be avoided or at least minimized under the most unfavorable conditions of use and to provide a simple and efficient stop motion for the shifting mechanism employed to dispose the pusher members alternately and intermittently in their operative and inoperative paths respectively for active and return movements.

Further objects and advantages of the invention will appear in the course of the following description of a preferred embodiment, it being understood however that changes in form, proportion and details may be resorted to within the scope of the appended claims without departing from the principles involved.

In the drawings:

Figure 1 is a side view of a propelling apparatus or tractor constructed in accordance with the invention.

Fig. 2 is a plan view of the same.

Fig. 3 is a detailed transverse sectional view taken on a plane indicated by the line 3—3 of Fig. 1.

Fig. 4 is a detailed sectional view on the plane indicated by the line 4—4 of Fig. 1.

Fig. 5 is a detailed view in perspective of the disk elements of the shifting mechanism with associated parts, said disks being shown separated.

In the form of the device selected as an illustration of the invention, the essential parts are a prime mover 10 which may consist of a motor of any of the well known types employing gas, steam, electricity or other motive agent; one or more pusher members 11 designed for reciprocatory movement and adapted during a portion of each cycle of movement to engage the ground or road-way so that a forward thrust may be imparted to the structure; a shifting mechanism represented generally at 12 and embodying means whereby the pusher members are alternately disposed in operative and inoperative positions so that the active movements thereof may serve to advance the tractor while the return movements are effected idly; and connections between the prime mover and said pusher members and shifting mechanism whereby the latter are operated in timed relation as hereinafter explained in detail.

It is obvious that any preferred construction of frame work such as that indicated at 18 may be employed for the support of the motor 10 and it may, as shown, be provided with a forwardly extending tongue 14 by which connection may be made with a vehicle or machine to be propelled, said frame also serving as a support for the pusher members of which any preferred number may be employed and the shifting mechanism which serves to control the paths of movement of said members. As shown, each pusher member consists of a carrier 15 slidably mounted in a suitable guide 16 carried by the frame 13 and provided with suitable anti-friction devices 17, a pusher foot 18 supported by the carrier in a downwardly and rearwardly inclined position so that as the carrier which is pivotally mounted at 19 for swinging movement in a substantially vertical plane is depressed the toe 20 of the foot is brought into effective engagement with the soil or surface traversed by the machine. Each carrier receives motion from a crank arm 21 on the shaft 22 of the prime mover through a pitman 23 and is adapted in operation to be impelled rearwardly or actively in a substantially horizontal path as illustrated in full lines of Fig. 1 and to receive a return movement while in a position indicated in dotted lines in the same figure and during which return movement the pusher member is inoperative by reason of the removal of the foot from contact with the ground or surface traversed by the machine.

The means for controlling the position or path of movement of each pusher member includes a shifting member 24 consisting in the construction illustrated of a disk having a slot and pin connection with the carrier of the pushing member and formed for example, by providing said disk with a pin 25 operating in a slot or guide 26 in the carrier, a suitable anti-friction roller 27 being also employed in this connection. This shifting member is adapted for an intermittent revoluble movement so as to alternately hold the pusher member which is controlled thereby either in the operative path shown in full lines in Fig. 1 or the inoperative path shown in dotted lines in said figure and in order that said disk may at the proper intervals receive the advance movement required to properly position the pusher member, there is employed an operating disk 28 located as shown adjacent to the disk 24 and carrying a latch 29 yieldingly held as by a spring 30 in position for engagement at its free end with a seat 31 in the periphery of the disk 24 but adapted alternately or at intervals between its engagement with the seats of said disk 24 to be withdrawn therefrom by means of a trip 32 consisting of a curved rod extending over the path traversed by the tail portion of said latch. The operating member 28 preferably receives continuous rotary motion from the prime mover through a drive shaft 33 extending longitudinally of the supporting frame and carrying beveled gears 34 and 35 which mesh respectively with gears 36 and 37 on the spindles 38 and 39 of the operating disks, the shifting disks, of which two are shown in the drawings, being loosely mounted upon said spindles and being adapted to receive motion alternately and intermittently as the latches carried by the operating disk respectively engage the same as will be understood more clearly by reference to Fig. 3.

In order to maintain each shifting disk in its adjusted position during the traverse active movements or return of the related pusher member, a detent 40 is employed for engagement with a notch 41 in said shifting disk, the detent being yieldingly held in engaging position by gravity or the equivalent thereof and the disengagement thereof to permit the intermittent advance movements of the shifting disk being effected by means of a cam 42 carried by the related operating disk.

As will be understood therefore, both the shifting mechanism and the pusher members are driven directly by the prime mover, the latter receiving reciprocatory movement and being alternately positioned in operative and inoperative paths to cause the alternate engagement and disengagement of the pusher feed with reference to the ground or surface traversed by the machine, while the shifting mechanism through the coöperation of its continuously and intermittently movable elements, consisting of the disks 28 and 24, serves to position the pusher members and through the sliding connections between the shifting disks and the carriers direct the active and return movements of said pusher members, the movement of each carrier from the operative to the inoperative position being effected during the return movement of the carrier so that the toe of the foot is positively and effectively depressed into engagement with the ground or surface traversed preparatory to the succeeding active or pushing movement of the carrier. In this way the possibility of lost motion or of waste energy in the operation of the device is minimized and the full effect of the motor in driving the mechanism is utilized.

While the mechanism above described will operate successfully if the pitman rods 23 are actuated by oppositely set cranks driven from the motor 10, it will be obvious that in that case one pusher would be projected on its stroke at the same speed that the other would be retracted, excepting possibly for the slight variations resulting from the movements of cranks out of line with the guides 16. It is desirable for various reasons, however, to have the foot 18 move rather slowly to the rear on its active stroke, and then recover more quickly while it is out of the ground. This may be brought about by any appropriate connection between the motor and shaft 22, or, in the present case, the two shafts 22 having the cranks 21 which actuate the pitman rods. One successful embodiment is illustrated on the drawings herewith, in which connection is made directly to the main shaft 33. Fast on this shaft is a bevel pinion 50 meshing with two others 51 and 52 and driving them in opposite directions, and each of these driven pinions is fast on a short shaft 53 whose inner end is journaled in a bearing 54. These short shafts stand in alinement as seen in Fig. 2, and that at the bottom of that figure and in the foreground of Fig. 1 carries an eccentric driving gear 55. Meshing therewith is an eccentric driven gear 56, and for convenience in the description and illustration I have shaded that portion of this gear which is most remote from its axis and which might be called its "slow side" because when in mesh with the appropriate portion of the driving gear along this side, the driven gear will be turning more slowly. The remote driving and driven gears in Fig. 1 are numbered 57 and 58, and their construction is the same excepting that their high and low sides are reversed from the position of the high and low sides of those in the foreground, the result being that the slow side of the driven gear 58 is diametrically opposite the slow side of the driven gear 56. The shafts 22 of the driven gears carry cranks 21 connected with the pitman rods 23 described above, and it will be noted in Fig. 1 that the crank 21 of the gear 56 is at the beginning of the slow side of this gear, or in other words substantially 90° in advance of the highest point of this gear.

With this construction of driving mechanism, the nearer crank 21 in Fig. 1 is in position to start the active stroke of its pusher to the left, and the slow side of its gear 56 is coming into mesh so that the foot 18 with its toe 20 in the earth, is about to move rearward at a relatively slow speed to drive the tractor forward. The shifting disk 24 is at rest and its pin 25 in the slot 26 of the carrier keeps the foot in the earth. As the pusher completes its stroke, the cam 42 trips the detent 40, the latch 29 engages the lower seat 31 in the disk 24, and the latter is thus locked to its operating disk 28 and turns with it for half a revolution, until the latch is tripped at the top and the detent again holds the shifting disk 24. The intermittent rotary movement of the disk 24 thus produced is timed to synchronize with the reciprocations of the pusher, because both are driven through connections with the same main shaft 33. At the conclusion of the slow active stroke of the pusher the pin 25 rises, and the foot is thus lifted out of the ground during the rapid retractive stroke, and meanwhile the other foot (or others if there be more than two) are making their active and retractive strokes in the same manner.

What is claimed is:

1. A propelling apparatus having a prime mover, a reciprocatory pusher member, a shiftable guiding member for directing the pusher member alternately in operative and inoperative paths and consisting of a disk having a sliding connection with the pusher member and means actuated by the prime mover for operating said members in timed relation.

2. A propelling apparatus having a prime mover, a reciprocatory pusher member actuated by the prime mover, a shiftable guiding member consisting of a revoluble element having a pin and slot connection with the pusher member and means for imparting an intermittent movement to the revoluble element to alternately dispose the pusher member in operative and inoperative paths.

3. A propelling apparatus having a prime mover, a reciprocatory pusher member actuated by the prime mover and transversely movable to occupy operative and inoperative paths, a shiftable member consisting of a disk having a pin and slot guiding connection with the pusher member and a continuously movable operating member actuated by the prime mover and having pick-up mechanism for imparting intermittent advance movement to said disk.

4. A propelling apparatus having a prime mover, a reciprocatory pusher member actuated by the prime mover and transversely movable to occupy operative and inoperative paths, a shiftable member consisting of a disk having a pin and slot guiding connection with the pusher member and a continuously movable operating member actuated by the prime mover and having a latch for periodically engaging and alternately disengaging said disk.

5. A propelling apparatus having a prime mover, a reciprocatory pusher member actuated by the prime mover and having a pivotal carrier element provided with a pusher foot, a shiftable member consisting of a revoluble disk having a pin and slot guiding connection with the pusher member and a continuously movable operating member actuated by the prime mover and having a latch for periodically engaging and alternately disengaging said disk for imparting intermittent advance movement thereto.

6. A propelling apparatus having a prime mover, a reciprocatory pusher member actuated by the prime mover and provided with a pivotal carrier element having a pusher foot, a shiftable member consisting of a revoluble disk having a pin and slot guiding connection with the pusher member, a detent for engaging and holding said shiftable member when the related pusher member is in its operative position, a continuously revoluble operating member actuated by the prime mover and having a latch for periodically engaging said shiftable member to impart advance movement thereto, and trip mechanism for disengaging said latch from the shiftable member during the active movement of the pusher member.

7. A propelling apparatus having a prime mover, a reciprocatory pusher member actuated by the prime mover and transversely movable to occupy operative and inoperative paths, a shiftable member consisting of a disk having a guiding connection with the pusher member, a yielding detent for locking the shiftable member in a fixed position during the active movement of the pusher member, a continuously revoluble operating member actuated by the prime mover and provided with means for periodically disengaging said detent from the shiftable member, a latch carried by the operating member for engagement with the shiftable member to impart intermittent forward movement to the latter, and a trip for disengaging the latch at intermediate points in the path of movement of the operating member.

8. In a propelling apparatus, the combination with a pusher mounted at one end for reciprocation, shifting mechanism including two disks whereof one is constantly rotated from a prime mover and the other is intermittently driven by the first, and a sliding connection between the driven disk and the pusher for guiding the latter during its active stroke and raising it on its retractive stroke; of driving mechanism actuated by the same prime mover, and connections between it and said pusher for moving the same slowly on its active stroke and retracting it more rapidly.

In testimony whereof I affix my signature.

EDWARD R. HONEYWELL.